Oct. 10, 1961    W. J. FORTUNE    3,003,527
GUIDE FOR MAKING DADO CUTS
Filed Feb. 18, 1960    2 Sheets-Sheet 1
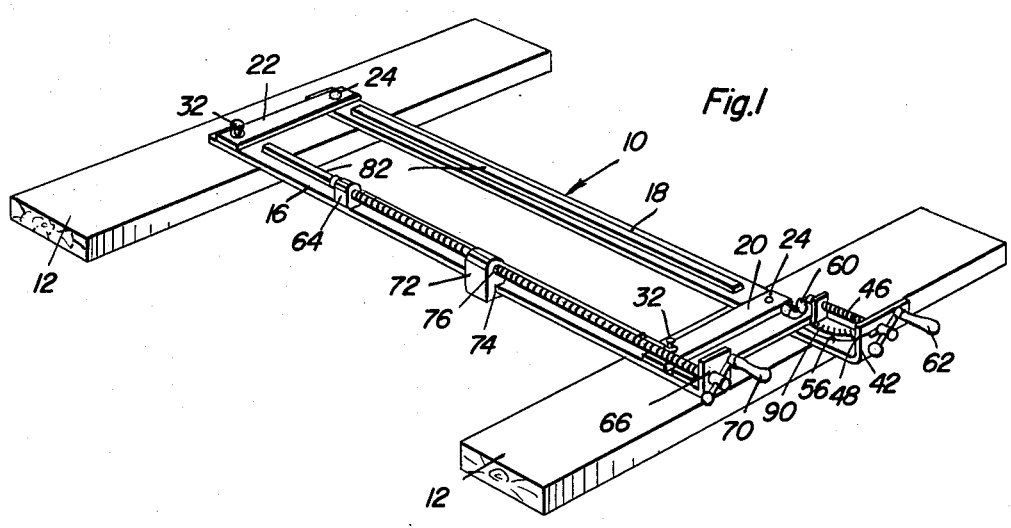
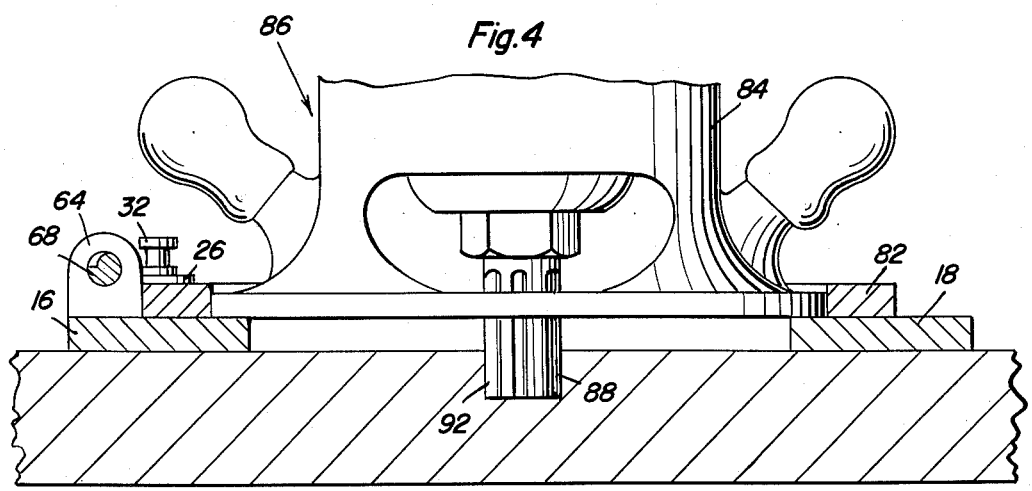
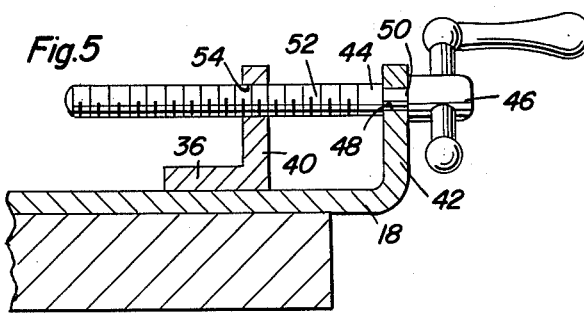
William J. Fortune
INVENTOR.

Oct. 10, 1961     W. J. FORTUNE     3,003,527
GUIDE FOR MAKING DADO CUTS
Filed Feb. 18, 1960     2 Sheets-Sheet 2
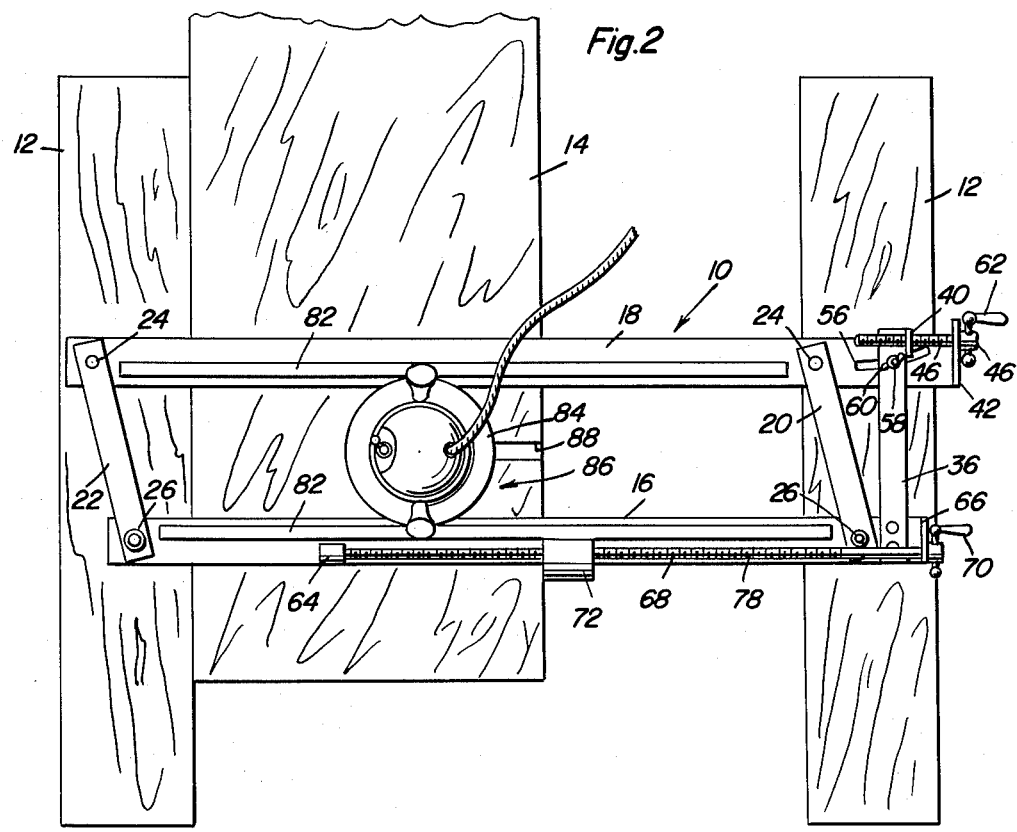
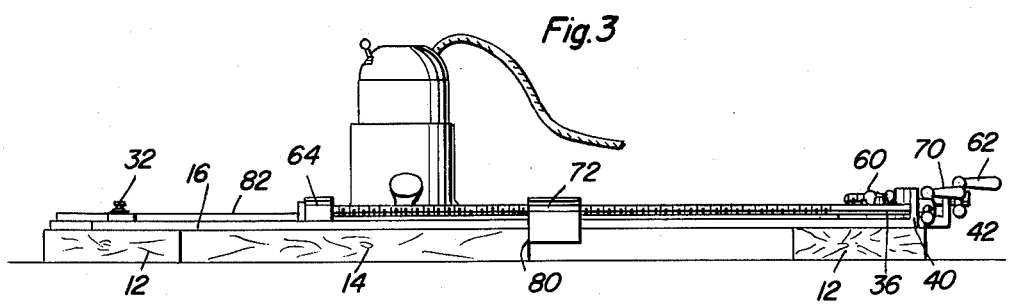
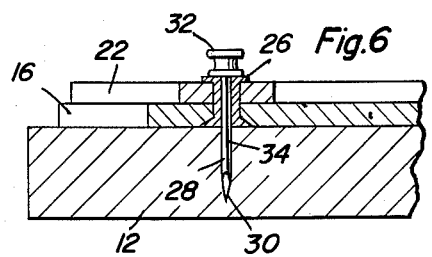
William J. Fortune
INVENTOR.

United States Patent Office 3,003,527
Patented Oct. 10, 1961

3,003,527
GUIDE FOR MAKING DADO CUTS
William J. Fortune, 946 S. 5th West, Missoula, Mont.
Filed Feb. 18, 1960, Ser. No. 9,458
6 Claims. (Cl. 144—136)

This invention relates to a novel and useful guide construction for making dado cuts and more particularly to a guide including a pair of parallel and spaced ways adapted to be mounted to support members on opposite sides of a workpiece. The ways each include guide means which are adapted to slidingly guide opposite sides of a router housing disposed therebetween whereby a straight dado cut may be made.

The parallel ways are interconnected for movement toward and away from each other while maintaining their parallel relationship so that the width of a dado cut may be adjusted by increasing or decreasing the distance between the parallel ways. If the distance between the parallel ways is greater than the width of the housing of a router, the router is first moved along the guide means on one of the ways to form one longitudinal edge of a dado cut and then moved along the guide means on the other way for making the other longitudinal side edge of the dado cut. In this manner, dado cuts of varying widths may be conveniently made.

The parallel ways of the guide are interconnected by means of a pair of links pivotally secured at their opposite end portions between corresponding end portions of the ways whereby an articulated parallelogram frame is formed. A support bar is fixedly secured at one end to one of the ways and projects laterally therefrom with its other end overlying the other way. The other end of the support bar is provided with an upstanding longitudinally extending flange and there is a similar flange formed on the way over which the free end of the support bar is disposed. The two flanges have opposing surfaces and a screw-threaded member is journalled for rotation as well as sliding movement in one of the flanges and is threadedly engaged in a threaded bore formed in the other flange whereby relative movement of the two ways may be effected upon rotation of the screw-threaded member.

The main object of this invention is to provide an extremely simple guide for making dado cuts which may be easily adjusted to form a dado cut of the desired width and which will be relatively portable and extremely simple to use.

A further object is to provide the guide with a means for removably securing a workpiece in fixed relation with the supporting surfaces of the guide so that extremely accurate cuts may be made.

A final object to be specifically enumerated herein is to provide a guide for making dado cuts which will be of simple construction and conform to conventional forms of manufacture so as to be durable and economically feasible.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the guide shown mounted upon a pair of supporting surfaces which are adapted to embrace a workpiece therebetween;

FIGURE 2 is a top plan view of the guide mounted upon a pair of spaced supports with a workpiece being clamped to one of the supports against relative movement therewith and showing the manner in which a router may then be guided to form a dado cut;

FIGURE 3 is a side elevational view of the assemblage shown in FIGURE 2;

FIGURE 4 is a fragmentary transverse vertical sectional view on somewhat of an enlarged scale taken substantially upon a plane passing through the center of the router of the assembly illustrated in FIGURE 2;

FIGURE 5 is a fragmentary vertical sectional view on somewhat of an enlarged scale of the components of the guide by which the spacing between the parallel ways may be adjusted; and FIGURE 6 is a fragmentary vertical sectional view on somewhat of an enlarged scale showing the manner in which the guide may be removably secured between a pair of supporting surfaces.

Referring now specifically to the drawings the numeral 10 generally designates the guide which is removably secured between a pair of supporting surfaces 12. The workpiece 14 is disposed between the supporting surfaces, see FIGURE 2 in particular, and is clamped in fixed relation relative to one of the supporting surfaces in a manner to be hereinafter more fully set forth.

The guide 10 includes a pair of parallel ways 16 and 18 which are interconnected at their opposite ends by means of a pair of parallel links 20 and 22 which are pivotally secured at their opposite ends between corresponding end portions of the ways 16 and 18. The links 20 and 22 are pivotally secured at one end to the way 18 in any convenient manner as at 24 and are pivotally secured at their opposite ends to the way 16 by means of a pair of hollow cylindrical rivet-like elements 26.

The way 16 is fixedly secured between the spaced supports 12 by means of nail-like fasteners 28 having a pointed end 30 and a laterally enlarged end 32 forming a head. The shank 34 of the fastener 28 is snugly and slidably received through the rivet-like elements 26 and the pointed end 30 of the fasteners 28 is engaged in the supports 12.

A support bar 36 is fixedly secured at one end to the way 16 and projects laterally therefrom to overlie the corresponding end portion of the way 18. An upstanding flange 40 which extends longitudinally of the support bar 36 is formed on the free end thereof and the adjacent end of the way 18 is also provided with an upstanding flange 42. The flanges 40 and 42 are substantially parallel to each other and the shank 44 of a screw member 46 is rotatably journalled in the flange 42. The flange 42 has a slot 48 formed therein which extends substantially parallel to the support bar 36 in which the diametrically reduced portion 50 of the shank 44 is rotatably journaled. The threaded portion 52 of the shank 44 is threadedly engaged in a threaded bore 54 formed in the flange 40, see FIGURE 5.

The way 18 has an arcuate slot 56 formed therein in which the headed end of a threaded fastener 58 is slidably disposed. The fastener 58 has a threaded shank portion (not shown) which projects upwardly through a bore (not shown) formed in the free end of the support bar 36 and a threaded nut 60 is threadedly engaged therewith to retain the ways 16 and 18 against relative movement. It is to be understood that the arcuate slot 56 is of a configuration to enable the way 18 to swing relative to the way 16.

If it is desired, the screw member 46 may be provided with a suitable crank 62 for effecting its rotation.

A journal block 64 is fixedly secured to the upper surface of the way 16 adjacent one end thereof and an upstanding flange 66 is formed on the other end of the way 16. A screw shaft 68 has one end portion rotatably journalled in the journal block 64 and its other end journalled through the flange 66 in a manner similar to the manner in which the screw member 46 is journalled in the flange 42. The screw shaft 68 may also be provided with a crank 70 if desired for facilitating rotation thereof and a clamping block 72 having a horizontally disposed notch 74 formed in one side thereof is slidably disposed on the way 16 for movement longitudinally thereof with the way 16 being slidably disposed through the slot 74. The upper portion of the clamping block 72 is provided with an internally threaded bore 76 through which the threaded shank portion 78 of the screw shaft 68 is threadedly engaged.

With particular attention now directed to FIGURE 3 of the drawings it will be noted that the portion of the clamping block 72 projecting below the way 16 is provided with an abutment surface 80 which is adapted to engage the edge of the workpiece 14 remote from the support surface 12 with which the opposite edge of the workpiece 14 is engaged.

It will thus be noted that the workpiece 14 may be clamped between the abutment surface 80 of the clamping block 72 and the confronting surface of the support 12 upon manipulation of the screw shaft 68.

Each of the ways 16 and 18 is provided with a longitudinally extending guide 82 which is adapted to slidingly engage opposite side surfaces of the housing 84 of a router assembly generally designated by the reference numeral 86.

When making a cut 88 in the workpiece 14 of the distance between the ways 16 and 18 is adjusted upon manipulation of the screw member 46 and may be at least roughly determined by means of the indicia 90 formed on the way 18. If the cut 88 is to be made only the width of the blade 92 of the router 86, the ways 16 and 18 are spaced apart a distance whereby the guides 82 will simultaneously slidably engage opposite side surfaces of the housing 84. The router 86 may then be moved longitudinally of the ways 16 and 18 to form the cut 88. If the cut 88 is to be made wider than the width of the blade 92, the distance between the ways 16 and 18 is appropriately adjusted and the router 86 is then moved longitudinally of the ways with a side edge thereof in sliding contact with one of the guides 82 to form one side edge of the cut 88 and then the router 86 is moved longitudinally of the ways with the housing 84 engaging the other guide 82 to form the other side edge of the cut 88.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A guide for making dado cuts comprising a frame, said frame including a pair of spaced and parallel ways, means interconnecting said ways for movement toward and away from each other while maintaining their parallel relationship, means adapting one of said ways for securement to support members disposed on opposite sides of a workpiece, parallel guide means on said ways adapted to slidingly guide opposite sides of a router housing, means for varying the distance between said ways, said interconnecting means comprising a pair of links pivotally secured at their opposite end portions between corresponding end portions of said ways forming a parallelogram linkage between said ways, a support bar fixedly secured at one end to said one way and projecting laterally therefrom with its other end overlying the other way, a pin and slot connecting between said other end of said bar and said other way with the slot of said pin and slot connection being arcuate to enable swinging movement of said other way relative to said one way, said distance varying means comprising a screw-threaded member having one end threadedly engaged with one of either of said support bar or said other way at one end and the other end journalled for rotation with the other of said support bar or said other way.

2. The combination of claim 1 wherein said links are pivotally secured to said one way by means of hollow sleeve-like connectors, and said securing means comprise headed rod-like fasteners snugly receivable through said connectors for engagement with said support members.

3. The combination of claim 2 wherein said fasteners each comprise nail-like elements having longitudinally extending and radially enlarged head portions on the ends thereof remote from the pointed end.

4. The combination of claim 1 including a clamp member slidably disposed on said one way having an abutment face projecting below said ways, and means for adjustably positioning said clamp member longitudinally of said one way.

5. The combination of claim 4 wherein said adjusting means comprises a screw shaft journalled for rotation at its opposite ends on opposite end portions of said one way with said screw shaft being disposed in parallel relation to said one way, said clamp member having a threaded bore through which said screw shaft is threadedly engaged.

6. A guide for making dado cuts comprising a frame, said frame including a pair of spaced and parallel ways, means interconnecting said ways for movement toward and away from each other while maintaining their parallel relationship, means adapting one of said ways for securement to support members disposed on opposite sides of a workpiece, parallel guide means on said ways adapted to slidingly guide opposite sides of a router housing, means for varying the distance between said ways, said interconnecting means including means for swingably mounting one of said ways to the other of said ways, a support bar fixedly secured at one end to said one way and projecting laterally therefrom with its other end overlying the other way, a pin and slot connection between said other end of said bar and said other way with the slot of said pin and said slot connection being arcuate to enable swinging movement of said other way relative to said one way, said distance varying means comprising a screw threaded member having one end readily engaged with one of either of said support bar or said other way at one end and the other end journaled for rotation with the other of said support bar or said other way.

References Cited in the file of this patent

UNITED STATES PATENTS

| | | |
|---|---|---|
| 1,022,883 | Seguin | Apr. 9, 1912 |
| 1,115,995 | Wilson | Nov. 3, 1914 |
| 1,679,074 | Carter | July 31, 1928 |
| 2,670,546 | Godfrey | Mar. 2, 1954 |
| 2,752,961 | Melgaard | July 3, 1956 |
| 2,838,838 | Lica | June 17, 1958 |
| 2,927,378 | Godfrey et al. | Mar. 8, 1960 |

FOREIGN PATENTS

| | | |
|---|---|---|
| 607,905 | Great Britain | Sept. 7, 1948 |